Figure 3:
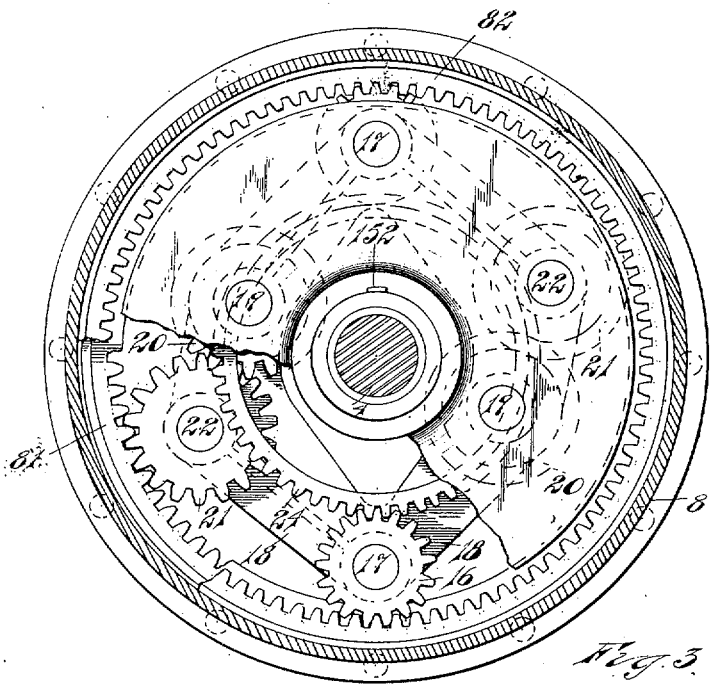

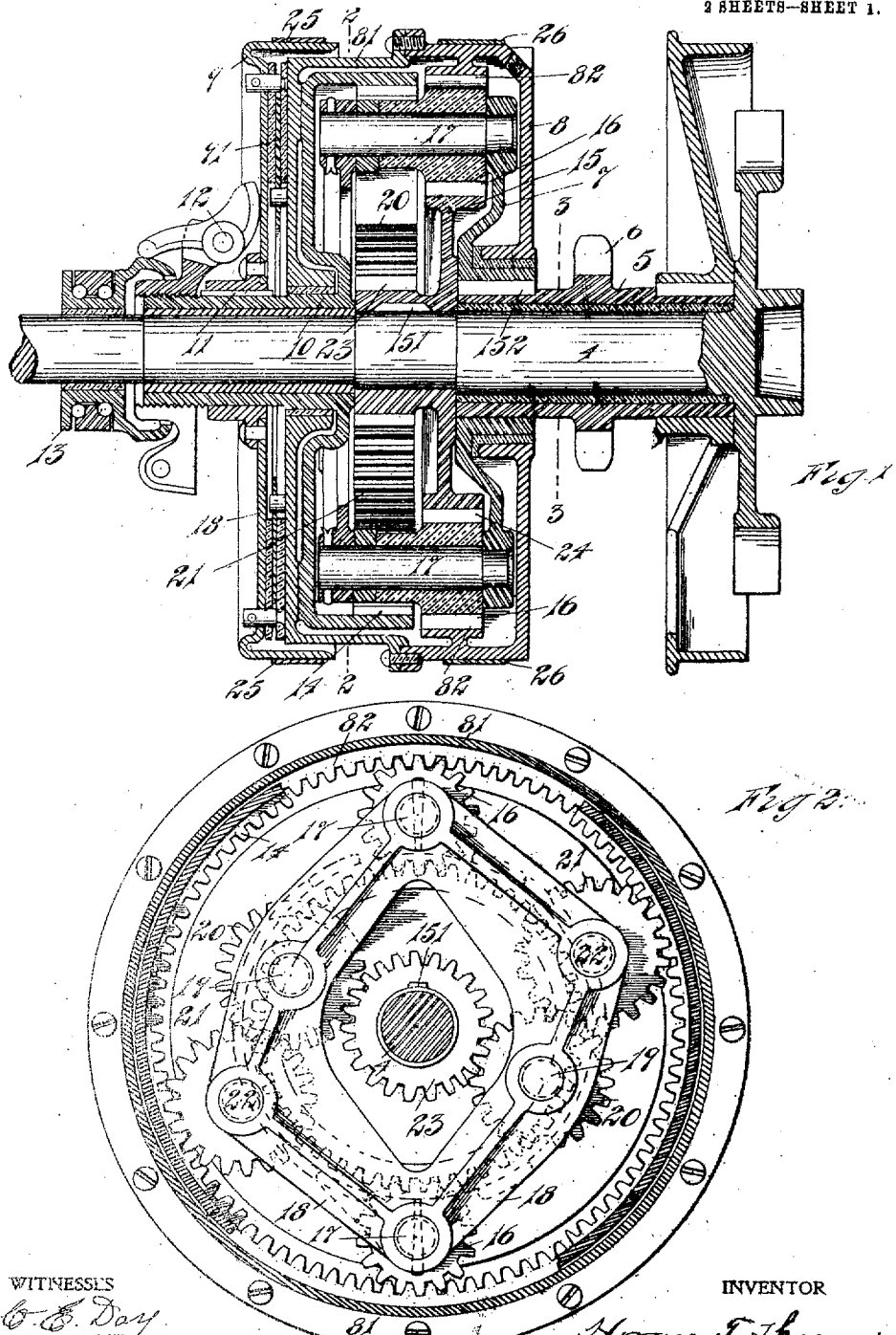

No. 850,857. PATENTED APR. 16, 1907.
H. T. THOMAS.
CHANGE SPEED GEAR.
APPLICATION FILED OCT. 4, 1906.

2 SHEETS—SHEET 2.

WITNESSES
INVENTOR
Horace T. Thomas
By Parker & Burton
Attorneys.

UNITED STATES PATENT OFFICE.

HORACE T. THOMAS, OF LANSING, MICHIGAN, ASSIGNOR TO REO MOTOR CAR COMPANY, OF LANSING, MICHIGAN, A CORPORATION.

CHANGE-SPEED GEAR.

No. 850,857.

Specification of Letters Patent.

Patented April 16, 1907.

Application filed October 4, 1906. Serial No. 337,349.

*To all whom it may concern:*

Be it known that I, HORACE T. THOMAS, a citizen of the United States, residing at Lansing, county of Ingham, State of Michigan, have invented a certain new and useful Improvement in Change-Speed Gears; and I declare the following to be a full, clear, and exact description of the same, such as will enable others skilled in the art to which it pertains to make and use the same, reference being had to the accompanying drawings, which form a part of this specification.

My invention relates to change-speed gears, and consists in the improvements hereinafter described, and pointed out in the claims.

In the accompanying drawings, Figure 1 is a longitudinal section. Fig. 2 is a section approximately on the line 2 2, Fig. 1, looking from the left of Fig. 1. Fig. 3 is a section on the line 3 3, Fig. 1, the adjacent face of the casing 8 being cut away, and also a portion of the arbor-bearing disk.

4 is the driving-shaft.

5 is a sleeve adapted to rotate around the shaft 4.

6 is a sprocket-wheel upon the sleeve 5, through which sprocket-wheel the power is designed to be transmitted by a chain. (Not shown.)

7 is a disk secured by a key 152 to the sleeve 5.

17 17 are arbors secured in the disk 7 near the periphery thereof. In said disk are also secured arbors 22 22 and 19 19.

18 is a frame joining the ends of the arbors 17 19 22 which are farthest from the disk 7.

8 is a portion of the casing, adapted to turn upon the hub of the disk 7. 81 is a second portion of the casing, secured to the portion 8 to complete the inclosing casing. The portion 81 of the casing is mounted to turn upon a bearing upon the hub of a wheel 10. The wheel 10 is mounted to rotate in a bearing around the shaft 4 and is provided near its periphery with internal gear-teeth 14.

9 is a disk surrounding the hub of the wheel 10 and secured to said hub by a key 11, so that it may move longitudinally of said hub, but is restrained from rotation relative thereto. The periphery of the disk 9 is turned inward to form a flange extending over the portion 81 of the casing 8 81.

91 represents a clutch between the portion 81 of the casing and the disk 9.

25 represents a brake-strap upon the peripheral flange of the disk 9, and 26 represents a similar flange upon the periphery of the casing 8 81.

12 13 represent an actuating mechanism by which the disk 9 may be moved longitudinally of the hub of the wheel 10 to set the clutch 91 and unite the disk 9 with the casing 8 81.

The portion 8 of the casing is provided near its periphery with internal gear-teeth 82.

15 is a double gear-wheel, secured by a key 151 to the shaft 4. The double gear-wheel 15 is made up of the single gear-wheels 24 of relative larger diameter and 23 of smaller diameter.

16 16 are gear-wheels the teeth of which engage the teeth of the gear-wheel 24 and the internal gear-teeth 82.

21 21 are gear-wheels the teeth of which engage the teeth of the internal gearing 14.

20 20 are gear-wheels the teeth of which engage the teeth of the gear-wheels 23 and 21. The gear-wheels 20 are mounted upon arbors 19, bearing in the disk 7 and frame 18, and the gear-wheels 21 21 are mounted upon arbors 22, bearing in said disk and frame.

The operation of the above-described device is as follows: To get the half speed ahead, the casing 8 81 is held stationary by a brake 26 upon its periphery. Motion is then communicated from the shaft 4, through the gear-wheel 24, to the gear-wheel 16, which is thereby caused to revolve by its engagement with the internal gear 82, carrying with it the disk 7, sleeve 5, and driving-sprocket 6. When it is desired to secure a reverse movement, the disk 9 is held stationary by a brake 25 upon its periphery. The disk 9 being keyed to the wheel 10 by the key or fin 11 prevents said wheel from rotating, and motion is then conveyed from the shaft 4 through the gear-wheel 23 and gear-wheels 20 and 21, the latter of which, acting upon the internal gear 14, produces a reverse revolution of the disk 7 by means of the arbors 22 22. When it is desired to use the high speed, the apparatus 12 13 is operated to cause the clutch 91 to engage the disk 9 with the casing 81 8, in which case all the parts are locked together and the disk 7, sleeve 5, and sprocket-wheel 6 turns with the shaft 4.

It will be seen that the casing 8 81, with the internal gear 82, forms a fulcrum member for the train of direct gears 24 16, and the wheel 10, with its internal gear-teeth 14, forms a fulcrum member for the train of reverse-gears 23 20 21.

What I claim is—

1. The combination of a driving and a driven member, a train of direct gears including a fulcrum member between said driving and driven members, a train of reverse-gears including a fulcrum member between said driving and driven members, means for preventing and permitting rotation of one or the other of said fulcrum members, and means for connecting and disconnecting said fulcrum members.

2. The combination of a driving and a driven member, a train of direct gears including a fulcrum member between said driving and driven members, a train of reverse-gears including a fulcrum member between said driving and driven members, means for preventing and permitting rotation of one or the other of said fulcrum members, and means for connecting and disconnecting said fulcrum members, one of said fulcrum members being shaped to form a casing inclosing said gearing and the other fulcrum member.

3. The combination of the shaft 4, disk 7, arbors on said disk, a gear-wheel 24 on said shaft, a gear-wheel 16 on one of said arbors, a gear-wheel 23 on said shaft, a gear-wheel 21 on one of said arbors, a gear-wheel 20 on one of said arbors and engaging the gear-wheels 23 and 21, a fulcrum member 8, 82, engaging the wheel 16, a fulcrum member 10 engaging the wheel 21, means for preventing and permitting the rotation of one or the other of said fulcrum members, and means for connecting and disconnecting said fulcrum members.

4. The combination of the shaft 4, disk 7, having a hub sleeved on said shaft, gear-wheels on said shaft and disk engaging with each other; a wheel 10 having a hub sleeved on said shaft, gear-wheels upon said shaft and disk engaging with each other, a casing pivoted upon said hubs and inclosing said gearing, said casing being provided with gear-teeth to engage with one of said intermeshing gearings, gear-teeth on the wheel 10 adapted to engage the other of said intermeshing gearings, and means for acting upon the hub of the wheel 10 for restraining said wheel from rotation and releasing the same, and means for connecting the wheel 10 with said casing and releasing the same, substantially as and for the purpose described.

5. The combination of the shaft 4, disk 7, having a hub sleeved on said shaft, gear-wheels on said shaft and disk engaging with each other, a wheel 10 having a hub sleeved on said shaft, gear-wheels upon said shaft and disk engaging with each other, a casing pivoted upon said hubs and inclosing said gearing, said casing being provided with gear-teeth to engage with one of said intermeshing gearings, a part slidingly keyed upon the hub of the wheel 10 outside of said casing, a clutch between said part and said casing adapted to be operated by the movement of said part to engage, said casing therewith, means for actuating said part, and means for holding said part from rotation, substantially as and for the purpose described.

6. The combination of a driving and a driven member, a train of gears including a fulcrum member between said driving and driven members, a second train of gears including a fulcrum member between said driving and driven members, means for preventing and permitting rotation of one or the other of said fulcrum members, and means for connecting and disconnecting said fulcrum members, substantially as and for the purpose described.

In testimony whereof I sign this specification in the presence of two witnesses.

HORACE T. THOMAS.

Witnesses.
E. F. PEER,
GRETA LAYCOX.